United States Patent [19]

Tuy

[11] Patent Number: 5,446,799
[45] Date of Patent: Aug. 29, 1995

[54] CT SCANNER WITH IMPROVED PROCESSING EFFICIENCY 180 DEGREES+ FAN ANGLE RECONSTRUCTION SYSTEM

[75] Inventor: Heang K. Tuy, Chesterland, Ohio

[73] Assignee: Picker International, Inc., Highland Hts., Ohio

[21] Appl. No.: 146,985

[22] Filed: Nov. 1, 1993

[51] Int. Cl.$^6$ .................... G06K 9/00; G06F 15/00
[52] U.S. Cl. ........................ 382/132; 378/4; 364/413.17
[58] Field of Search .............. 382/6; 378/11–13, 378/20; 364/413.14, 413.15, 413.16, 413.17, 413.19, 413.21, 413.2

[56] References Cited

U.S. PATENT DOCUMENTS

| | | | |
|---|---|---|---|
| 3,778,614 | 12/1973 | Hounsfield | 378/11 |
| 4,010,370 | 3/1977 | Lemay | 378/12 |
| 4,052,619 | 10/1977 | Hounsfield | 378/11 |
| 4,293,912 | 10/1981 | Walters | 364/414 |
| 4,578,753 | 3/1986 | Crawford et al. | 364/413.19 |
| 4,674,045 | 6/1987 | Kerber et al. | 364/413.21 |
| 4,991,093 | 2/1991 | Roberge et al. | 364/413.15 |
| 5,014,293 | 5/1991 | Boyd et al. | 378/11 |
| 5,032,990 | 7/1991 | Eberhard et al. | 364/413.14 |
| 5,079,697 | 1/1992 | Chesler | 364/413.2 |
| 5,148,499 | 9/1992 | Matsumura | 364/413.19 |
| 5,214,581 | 5/1993 | Rhodes et al. | 364/413.19 |

OTHER PUBLICATIONS

"Convolution Reconstruction Techniques for Divergent Beams", Herman, et al. Comput. Biol. Med. Pergamon Press 1976 vol. 6, pp. 259–271.

Primary Examiner—Joseph Mancuso
Assistant Examiner—Gerard Del Rosso
Attorney, Agent, or Firm—Fay, Sharpe, Beall, Fagan, Minnich & McKee

[57] ABSTRACT

An x-ray source (14) is rotated along a non-circular path (18) to irradiate a subject in an examination region (10) with a fan beam (16) of radiation. Radiation detectors convert rays of the fan beam which have traversed the examination region into electronic data which is stored as data fans in an initial data memory (22). Each data fan is zero-filled (24) and convolved by a convolver (30). Preferably, the convolver transforms each data fan into Fourier-space (32), filters each data fan in Fourier-space with a roll-off filter (36), and converts the filtered data fan back from Fourier-space (38). Each fan is weighted (42) by a 1/cos weighting function and stored in a weighted data memory (44). Rays which are redundant in a 180°+ fan reconstruction are removed (46) from the convolved data fans. A pixel driven backprojector (50) backprojects each convolved and redundant ray removed data fan into an image memory (56). The backprojector weights each data value of each ray in proportion to 1/R, where R is a distance from the apex of the backprojected convolved fan to each corresponding pixel of the resultant image. A video processor (60) converts the electronic image representation stored in the image memory (56) into appropriate format for display on a video monitor (62).

4 Claims, 5 Drawing Sheets

CT SCANNER WITH IMPROVED PROCESSING EFFICIENCY 180 DEGREES+ FAN ANGLE RECONSTRUCTION SYSTEM

BACKGROUND OF THE INVENTION

The present invention relates to the diagnostic imaging arts. It finds particular application in conjunction with computer tomographic (CT) scanners and will be described with particular reference thereto. However, it is to be appreciated that the present invention is also applicable to rotating nuclear or gamma cameras, and the like.

Early CT scanners were of a traverse and rotate type. That is, a radiation source and oppositely disposed radiation detector traversed together along linear paths on opposite sides of the subject. The detector was repeatedly sampled during the traverse to create a plurality of data values representing parallel rays through the subject. After the traverse, the entire carriage was rotated a few degrees and the source and detector were traversed again to create a second data set. The plurality of parallel ray data sets at regular angular intervals over 180° were reconstructed into a diagnostic image. Unfortunately, the traverse and rotate technique was very slow.

One technique for speeding traverse and rotate scanners was to replace the radiation source and single detector with a radiation source that projected radiation along a narrow fan beam and to provide several detectors such that a plurality of parallel ray data sets at different angles were collected concurrently. In this manner, several of the data sets could be collected concurrently. This was several times faster, but still very slow.

Rather than traversing the source and detector, it was found that the radiation source could be rotated only. That is, the radiation source projected a fan of data which spanned the examination region or scan circle. An arc of radiation detectors received the radiation which traversed the examination region. The radiation source was rotated around the subject. In a third generation scanner, the arc of detectors or an entire ring of stationary detectors rotated with the source. In a fourth generation scanner, an entire ring of stationary detectors was provided. In either type, fan beam data sets were sampled at a multiplicity of apexes around the subject. The data from the different angles within the fans at different angular orientations of the fan were sorted into parallel ray data sets. It was found that a complete set of parallel ray data sets could be generated by rotating the source 180°+ the fan angle. Although much faster than the traverse and rotate technique, a large amount of data processing was required to sort or rebin the rays into the parallel ray data sets and to interpolate, as necessary, in order to make the rays within each data set more parallel. Although the data collection time was much faster, the image processing was slow.

Rather than sorting the data into parallel ray data sets, it was found that the fan beam data sets could be reconstructed directly into an image representation by convolution and backprojection. The original convolution reconstruction technique for CT scanners is generally credited to A. V. Lakshminarayanan. His convolution technique is described, for example, in "Convolution Reconstruction Techniques for Divergent Beams", Herman Lakshminarayanan, and Naparstek, Comput. Biol. Med. Vol. 6, pp. 259–271 (1976). Although the convolution and backprojection technique required significantly less processing hardware and time than the rebinning technique, the data collection was slower. In particular, the Lakshminarayanan algorithm required the apexes of the data fans to span a full 360°, not just the 180°+ fan angle.

U.S. Pat. No. 4,293,912 of R. Walters describes an improved convolution and backprojection technique in which the apexes of the data fans need only span 180° plus the fan angle. Although the Walters technique has proved successful and even today is among the most widely used CT reconstruction algorithms, it still has several drawbacks. One of the drawbacks of the Walters technique is that it performs an estimation of line integral data which is computationally complex and time consuming. Another disadvantage is that in the backprojection, the data is weighted as $1/R^2$ which requires a squaring operation for every projection of every data point. This squaring operation is again time consuming and delays the processing time.

The present application contemplates a CT scanner with a new and improved image reconstruction system which overcomes the above-referenced problems and others.

SUMMARY OF THE INVENTION

In accordance with one aspect of the present invention, a plurality of data fans are collected and zero filled. That is, the length of each data fan is increased, e.g. doubled, by adding zeroes to the end to eliminate or minimize edge error. The zero-filled fans are then convolved and backprojected into an image representation.

In accordance with another aspect of the present invention, each of the data fans is convolved. Redundant rays are zeroed out of the convolved data sets. The convolved data sets are then backprojected into an image representation.

In accordance with another aspect of the present invention, each of the data fans is Fourier transformed and filtered in Fourier-space with a roll-off filter. The data is inverse transformed back from Fourier-space and weighted in accordance with the distance between the fan apex and the origin of the coordinate system. The convolved data sets are then backprojected into an image representation.

In accordance with another aspect of the present invention, fan data is convolved. The convolved fan beam data sets are backprojected with a pixel driven backprojector into an image representation. Each of the convolved data fans is weighted with the selected weighting by image pixel being generally in accordance with 1/R, where R is the distance from the fan apex to the pixel.

One advantage of the present invention resides in its processing efficiency.

Another advantage of the present invention is that the apex of the data fans need not be constrained to a circle.

Another advantage of the present invention is that it enables data collected from non-circular CT scanners, e.g. CT scanners which are oval like the human body, to be reconstructed efficiently.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
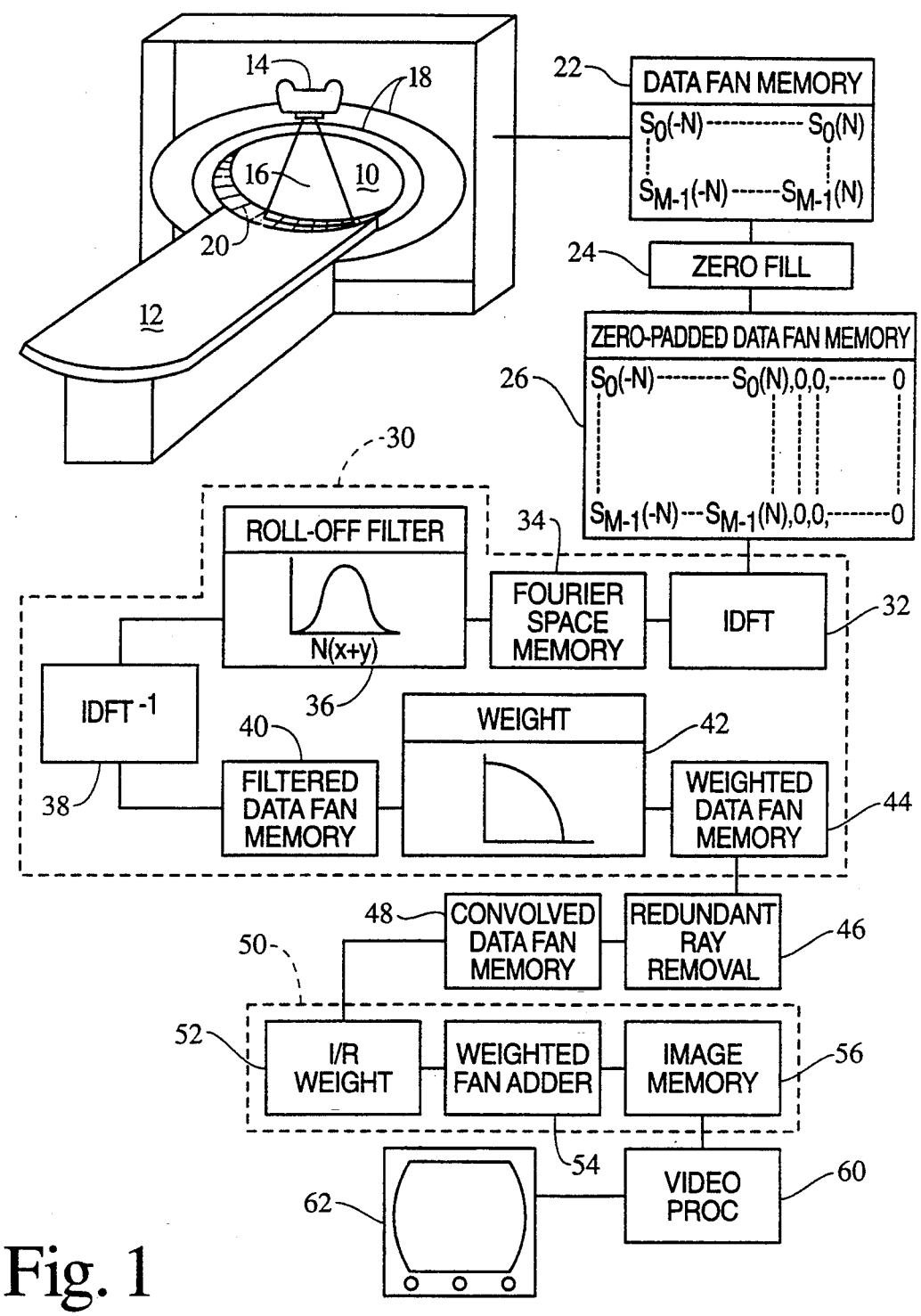
FIG. 1 is a diagrammatic illustration of a CT scanner system in accordance with the present invention.

With reference to FIG. 1, a CT scanner or other non-invasive examination apparatus examines an interior region of a subject in an examination region 10 and generates data indicative thereof. The CT scanner includes a subject support 12 for supporting a workpiece or patient to be examined in the examination region. An irradiating means 14, such as an x-ray tube, irradiates the patient with a fan beam 16 of x-rays or other penetrating radiation. The irradiating means 14 is mounted such that an apex of the fan beam of radiation rotates around the examination region 10. In the illustrated embodiment, the x-ray source moves around an oval track 18 which generally parallels the cross-section of the subject. Rays of the fan-shaped beam of radiation which have traversed the examination region are received by a ring of radiation detectors 20. In the illustrated embodiment, the ring of radiation detectors extends along an oval path which generally parallels the cross-section of the subject. Alternately, the x-ray detectors can be mounted to the track or x-ray tube such that the detectors and x-ray beam rotate together with the detectors remaining across the examination region from the x-ray source.

A fan beam data memory means 22 stores original electronic data fans from the CT scanner. Each data fan $S(n)$ has $2N+1$ data values representing $2N+1$ rays along the fan. More specifically, an initial fan has data values from $S_0(-N)$ through $S_0(N)$. M fans of data are collected with the M-th fan having $2N+1$ data values $S_{M-1}(-N)$ through $S_{M-1}(N)$. A zero-filling means or step 24 pads zero data values to the end of each data fan. In the preferred embodiment, the zero-filler 24 adds $2N+1$ zeroes to the end of each fan to protect against edge error. A zero-filled data memory 26 stores at least one of the zero-padded or zero-filled data fans.

A convolver means 30 convolves each zero-padded data fan. The convolver means includes a one-dimensional Fourier transform means 32, such as a Fast Fourier transform chip, which performs a one-dimensional transform along each zero-padded data fan transforming it into Fourier-space. A Fourier-space buffer or memory means 34 stores the Fourier-space data fans. A roll-off filter, preferably the roll-off filter described in Equation (39) below, filters each Fourier-space data fan to sharpen the data. An inverse one-dimensional Fourier transform means 38 transforms each filtered data fan from Fourier-space back to data space. A filtered data fan buffer or memory means 40 stores each filtered data fan in data space. Optionally, the roll-off filter means 36 operates on each data fan in the time domain, eliminating the Fourier transform and the inverse Fourier transform means or steps 32, 38. However, with the preferred roll-off filter, the computational speed is accelerated by filtering in Fourier-space.

A weighting means 42 weights each data value of each filtered data fan in accordance with a distance between the vertex of the fan and each data point. More specifically to the preferred embodiment, the weighting function weights across each data fan with a 1/cos weighting with the distance from the vertex to the center, preferably with the weighting function of Equation (44) below. Each weighted data fan is stored in a weighted data fan buffer or memory means 44. A redundant ray removal means 46 eliminates redundant rays of each convolved data fan. Removing redundant rays after convolution eliminates the sharp discontinuities that typically occur when the redundant rays are removed prior to convolution. The redundant rays may be zeroed in accordance with Equation (32) below, or may be averaged in accordance with Equation (33) below. A redundant ray corrected convolved data buffer or memory means 48 stores the convolved, redundancy corrected data rays.

A pixel driven backprojecting means 50 backprojects each of the convolved data fans to reconstruct an electronic diagnostic image representation. A weighting means 52 weights each data fan, image pixel by image pixel. The weighting is again proportional to the inverse of the first power of the distance R, i.e. 1/R, from the fan vertex to each image pixel. An adding means 54 adds each weighted data fan to appropriate rows of the electronic image representation assembled and stored in a reconstructed image memory 56.

A video processor 60 converts image data from the image memory 66 into appropriate format for display on a video monitor 62. Optionally, printers and other known devices may be utilized for converting the image data stored in the image memory 56 into a human-readable format.

Looking at the present reconstruction technique from a more mathematical perspective, Radon's inversion formula provides the reconstruction of a function f from its line integrals $$p_\theta(l) = \int_{-\infty}^{\infty} f(l\Theta + t\Theta^\perp)dt. \tag{1}$$

Below is a simple derivation of the inversion formula.

The projection theorem provides the relationship between the one dimensional Fourier transform of $p_\theta$ with the two-dimensional Fourier transform of the function f along the line of direction $\Theta = (\cos\theta, \sin\theta)$. More precisely, $$\hat{p}_\theta(\rho) = \hat{f}(\rho\Theta). \tag{2}$$

Expressing the function f as the inverse Fourier transform of $\hat{f}$, $$f(X) = \int_{R^2} \hat{f}(\Xi)e^{2i\pi<X,\Xi>}d\Xi. \tag{3}$$

In polar coordinate, the above equation can be rewritten as, $$f(X) = \int_0^\pi \int_{-\infty}^\infty |\rho|\hat{f}(\rho\Theta)e^{2i\pi\rho<X,\Theta>}d\rho d\theta. \tag{4}$$

From Equation (2) of the projection theorem, $$f(X) = \int_0^\pi \int_{-\infty}^\infty |\rho|\hat{p}_\theta(\rho)e^{2i\pi\rho<X,\Theta>}d\rho d\theta. \tag{5}$$

The inner integral of the right hand side of the last equation is nothing but the convolution of $p_\theta$ with the convolution filter q which is the inverse Fourier transform of the function $|\rho|$, i.e.

$$f(X) = \int_0^\pi q * p_\theta(<X,\Theta>)d\theta, \tag{6}$$

where, $$q * p_\theta(r) = -\frac{1}{2\pi^2} FP \int_{-\infty}^\infty \frac{1}{(r-l)^2} p_\theta(l)dl, \tag{7}$$

because the inverse Fourier transform of the function $|\rho|$ is $FP(-1/2\pi^2 l^2)$. Equation (6) is usually referred to as the Radon inversion formula, or convolution back-projection algorithm.

The above inversion formula is suitable for parallel beam geometry data collection. In practice, the geometry of the data collection is commonly a fan beam geometry. We shall establish a reconstruction formula which requires the data collection of 180 degree plus fan beam angle. To do this, we shall re-evaluate the convolution $$\begin{aligned}Q_\theta(r) &= FP \int_{-\infty}^\infty \frac{-1}{(r-l)^2} p_\theta(l)dl, \\ &= \frac{d}{dr} FP \int_{-\infty}^\infty \frac{-1}{r-l} p_\theta(l)dl,\end{aligned} \tag{4}$$

of Radon's inversion formula, Equation (6) using fan beam geometry. In fact, by replacing the expression $P_\theta$ by its definition, we obtain, $$Q_\theta(r) = \frac{d}{dr} FP \int_{-\infty}^\infty \int_{-\infty}^\infty \frac{1}{(r-l)} f(l\Theta + t\Theta^\perp)dt dl. \tag{9}$$

The above integral is over the whole plane in cartesian coordinates. We shall express this integral using the polar coordinate system in order to derive a reconstruction algorithm from fan beam data. We are restricting ourselves to the case of an object with finite extent, i.e., the function f is of compact support, and we assume that the trajectory $\Phi$ of the vertex of the fan satisfies the following condition:

For any given couple (X, $\theta$), there exists a $\psi$ with the following properties:

$$r = <X,\Theta> = <\Phi(\psi),\Theta>, \tag{10}$$

and $$<\Phi(\psi),\Theta^\perp> \neq 0. \tag{11}$$

Here we assume that the cure $\Phi$ is a function of the angle $\psi$.

Figure 2:
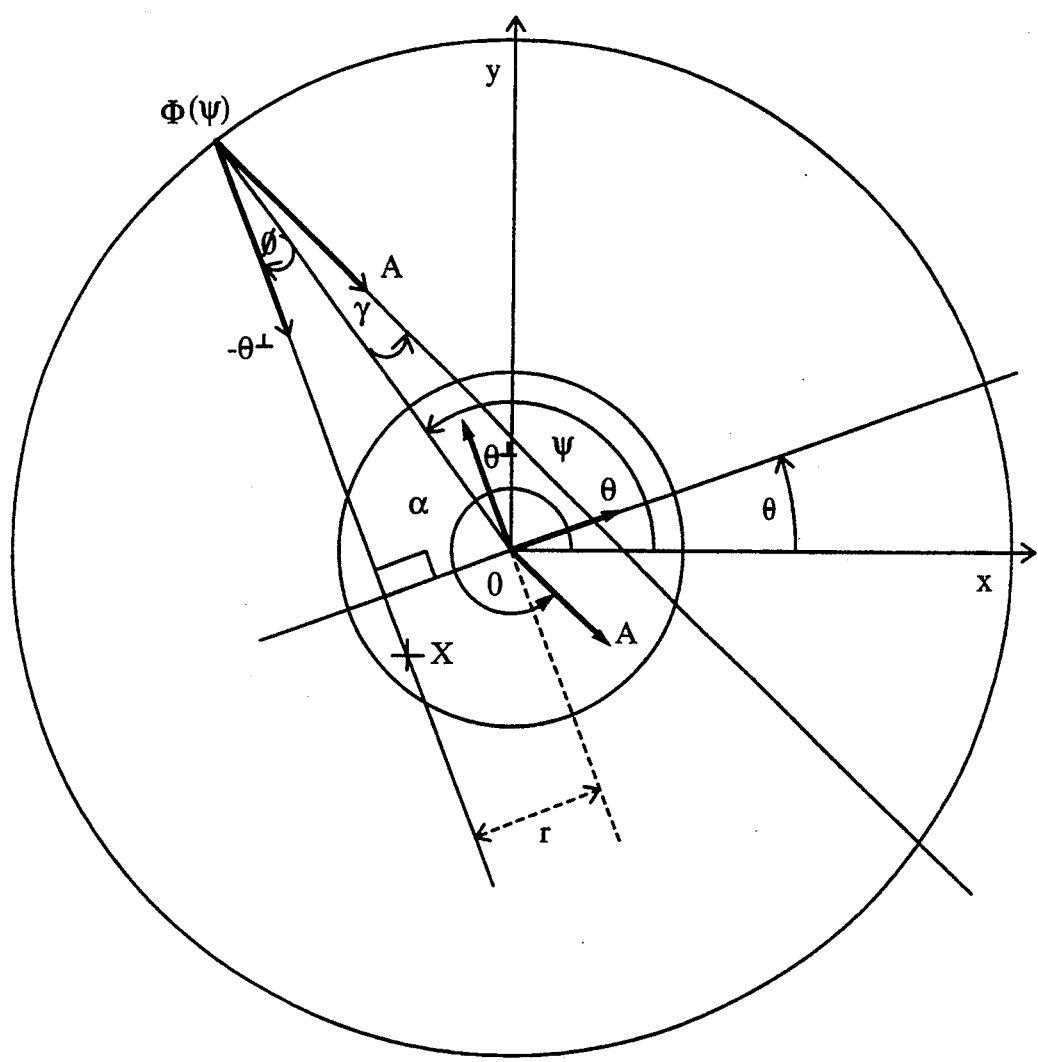
FIG. 2 illustrates geometric relationships in accordance with the present invention relative to the coordinate system of the CT scanner of FIG. 1.

To satisfy Equation (10) the vertex $\Phi(\psi)$ must be on the line perpendicular to the direction $\Theta$ and going through the point X, see FIG. 2. To satisfy Equation (11), $\Phi(\psi)$ must not be on the line going through the origin of the coordinate system, and parallel to $\Theta$.

For each couple (X, $\theta$), we make a change of variables defined by the following equation:

$$l\Theta + t\Theta^\perp = \Phi(\psi) + \rho A, \tag{12}$$

where $\psi$ satisfies Equation (10). Since the Jacobian of this transformation is equal to $\rho$, and since $l = <\Phi(\psi) + \rho A, \Theta>$, Equation (9) can be rewritten as, $$\begin{aligned}Q_\theta(r) &= \frac{d}{dr} FP \int_0^{2\pi} \int_0^\infty \frac{1}{(<\Phi(\psi),\Theta> - <\Phi(\psi)+\rho A,\Theta>)} \rho f(\Phi(\psi)+\rho A)d\rho d\alpha \\ &= \frac{d}{dr} FP \int_0^{2\pi} \int_0^\infty \frac{-1}{<A,\Theta>} f(\Phi(\psi)+\rho A)d\rho d\alpha.\end{aligned} \tag{13}$$

Defining the fan beam data at the vertex $\Phi(\psi)$ as $$g_\psi(\alpha) = \int_0^\infty f(\Phi(\psi)+\rho A)\,d\rho, \tag{14}$$

we have the following equation:

$$Q_\theta(r) = \frac{d}{dr} FP \int_0^{2\pi} \frac{-1}{<A,\Theta>} g_\psi(\alpha)d\alpha. \tag{15}$$

From Equation (10), we have $$\frac{dr}{d\theta} = <\Phi(\psi), \Theta^\perp>. \tag{16}$$

By differentiating with respect to $\theta$ first, and by using Equation (11), Equation (15) can be rewritten as, $$\begin{aligned}Q_\theta(r) &= \frac{1}{<\Phi(\psi),\Theta^\perp>} \frac{d}{d\theta} FP \int_0^{2\pi} \frac{-1}{<A,\Theta>} g_\psi(\alpha)d\alpha, \\ &= \frac{1}{<\Phi(\psi),\Theta^\perp>} FP \int_0^{2\pi} \frac{<A,\Theta^\perp>}{<A,\Theta>^2} g_\psi(\alpha)d\alpha.\end{aligned} \tag{17}$$

Let $\phi$ denotes the angle ($\Phi(\psi)$, $\Phi(\psi)-X$), $\gamma$ the angle between $\Phi(\psi)$ and the ray parallel to the vector A going through $\Phi(\psi)$, and $\Gamma$ the half-fan angle, see FIG. 2.

Expressing the angle $\alpha$ in terms of $\gamma$ and $\psi$, and the inner product of two vectors as the product of their modules with the cosine of their angle, we obtain, $$Q_\theta(r) = \tag{18}$$

$$\frac{1}{\|\Phi(\psi)\|\cos\phi} FP \int_{-\Gamma}^{\Gamma} \frac{-\cos(\phi-\gamma)}{\sin^2(\phi-\gamma)} g_\psi(\gamma+\psi+\pi)d\gamma.$$

Consequently, the integral of the right hand side of the above equation is nothing but the convolution of the function $g_\psi$ with the function h defined by $$h(\gamma) = -\frac{\cos\gamma}{\sin^2\gamma}. \tag{19}$$

It should be noted that there is no assumption made on the trajectory of the vertex $\Phi(\psi)$. In particular, the trajectory is not required to be a circle. It might further be noted that the vertex $\Phi(\psi)$ does not have to be outside of the support of the function to be reconstructed. From Equations (6), (7), and (8), we have the following inversion formula for fan beam reconstruction $$f(X) = \frac{1}{2\pi^2} \int_0^\pi Q_\theta(<X,\Theta>)d\theta, \tag{20}$$

where $Q_\theta(r)$ is given by Equation (18).

A natural and economical implementation of the above equation is to back-project each convolved view to every pixel of the image in the reconstruction field. The reconstructed image is simply the accumulating sum of the back-projections of convolved fan-beam views. For this purpose, we shall define a fan view $s_\psi$ for each angle $\psi$ associated to a vertex $\Phi(\psi)$ by the following equation:

$$s_\psi(\gamma) = g_\psi(\gamma+\psi+\pi). \tag{21}$$

We also define the convolution $q_\psi$ of the view $s_\psi$ with the filter h by $$q_\psi(\phi) = \frac{1}{\|\Phi(\psi)\|\cos\phi} FP \int_{-\Gamma}^{\Gamma} \frac{-\cos(\phi-\gamma)}{\sin^2(\phi-\gamma)} s_\psi(\gamma)d\gamma. \tag{22}$$

We have the following relation $$q_\psi(\Phi) = Q_\theta(r), \tag{23}$$

if $$\theta = \psi + \phi - \frac{\pi}{2}. \tag{24}$$

Figure 3:
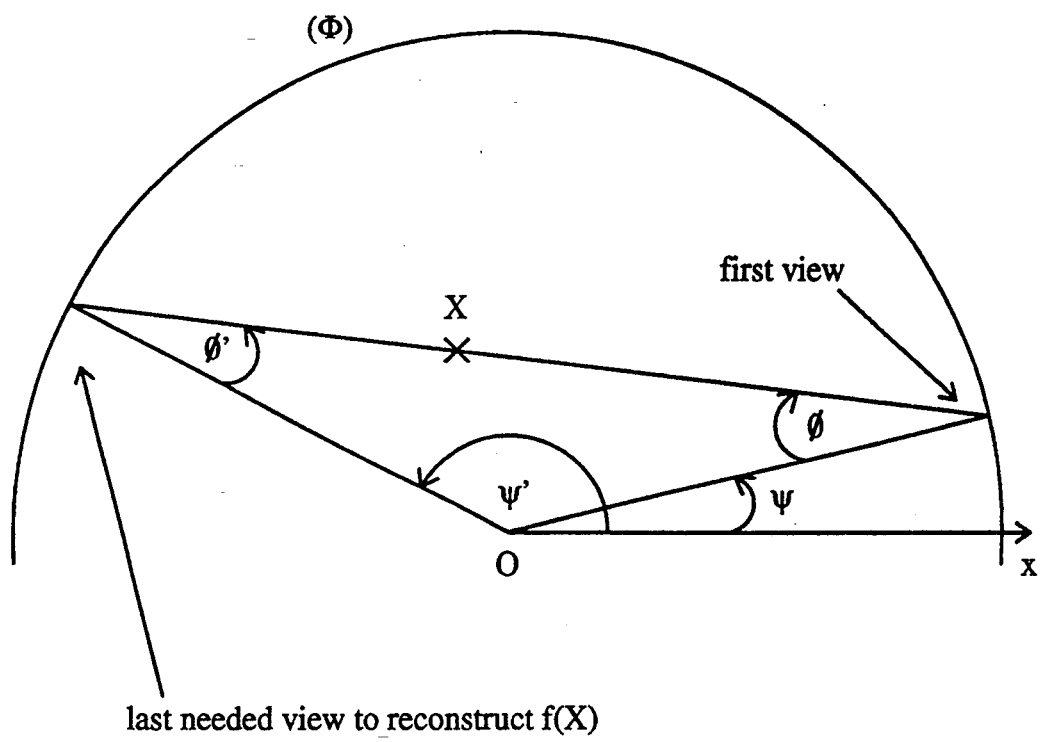
FIG. 3 is a diagrammatic illustration of the coordinate system illustrating the first and last views of a 180° plus fan angle data set.

The following important observations can be made:
1. For any point X along a ray joining the vertex of the starting view, we have sufficient data to reconstruct f(X) as soon as we have collected data all the way to the intersection of the trajectory $\Phi$ with the ray. In fact, if we assume that the first fan view starts at the angle $\psi$, then the angle associated to the case when the vertex is at the intersection of the trajectory $\Phi$ and the ray is given by (See FIG. 3)

$$\psi' = \psi + (\pi - \phi' + \phi). \tag{25}$$

Note that the above relation is based solely on the fact that the sum of angles of a triangle is 180 degree, and no assumption is made on the trajectory $\Phi$.

According to Equation (24), we have $$\begin{aligned} \theta' &= \psi' + \phi' - \frac{\pi}{2} \\ &= \psi + \phi + \frac{\pi}{2} \\ &= \theta + \pi. \end{aligned} \tag{26}$$

Figure 4:
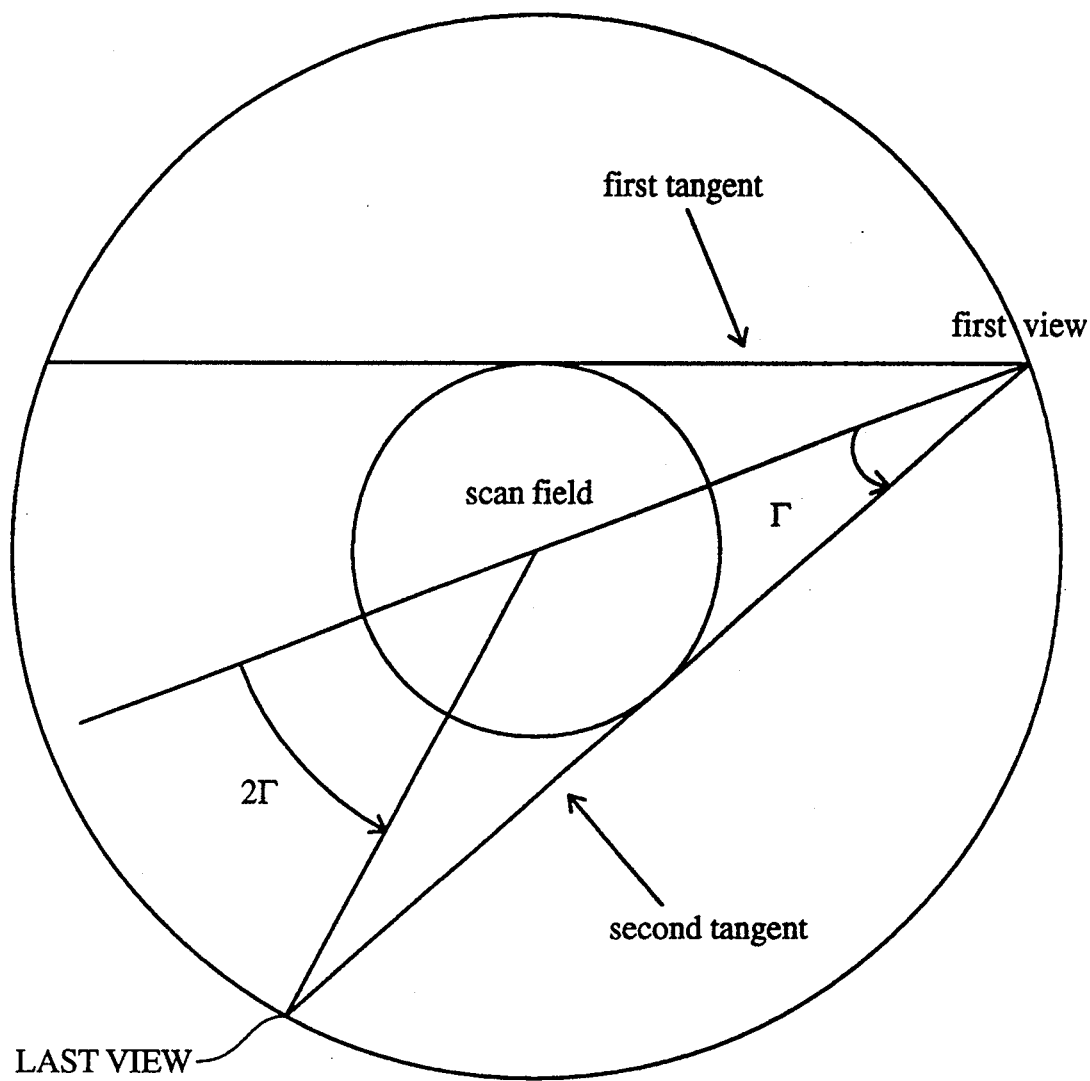
FIG. 4 is another diagrammatic illustration of the CT scanner coordinate system relative to 180° plus fan angle reconstruction geometries; and, FIG. 5 illustrates a coordinate transform used in the convolution and image reconstruction system of FIG. 1.

For this reason, with the current geometry where both the trajectory $\Phi$ and the scan field are concentric circles, we need 180 degree plus fan angle in order to be able to reconstruct pixels of the image along the second tangent to the reconstruction field, see FIG. 4.

In order to express the right hand side of Equation (20) in terms of the angle $\psi$, we compute $d\theta$. Based on Equation (24), we have $$d\theta = \left(1 + \frac{d\phi}{d\psi}\right)d\psi. \tag{27}$$

Figure 5:
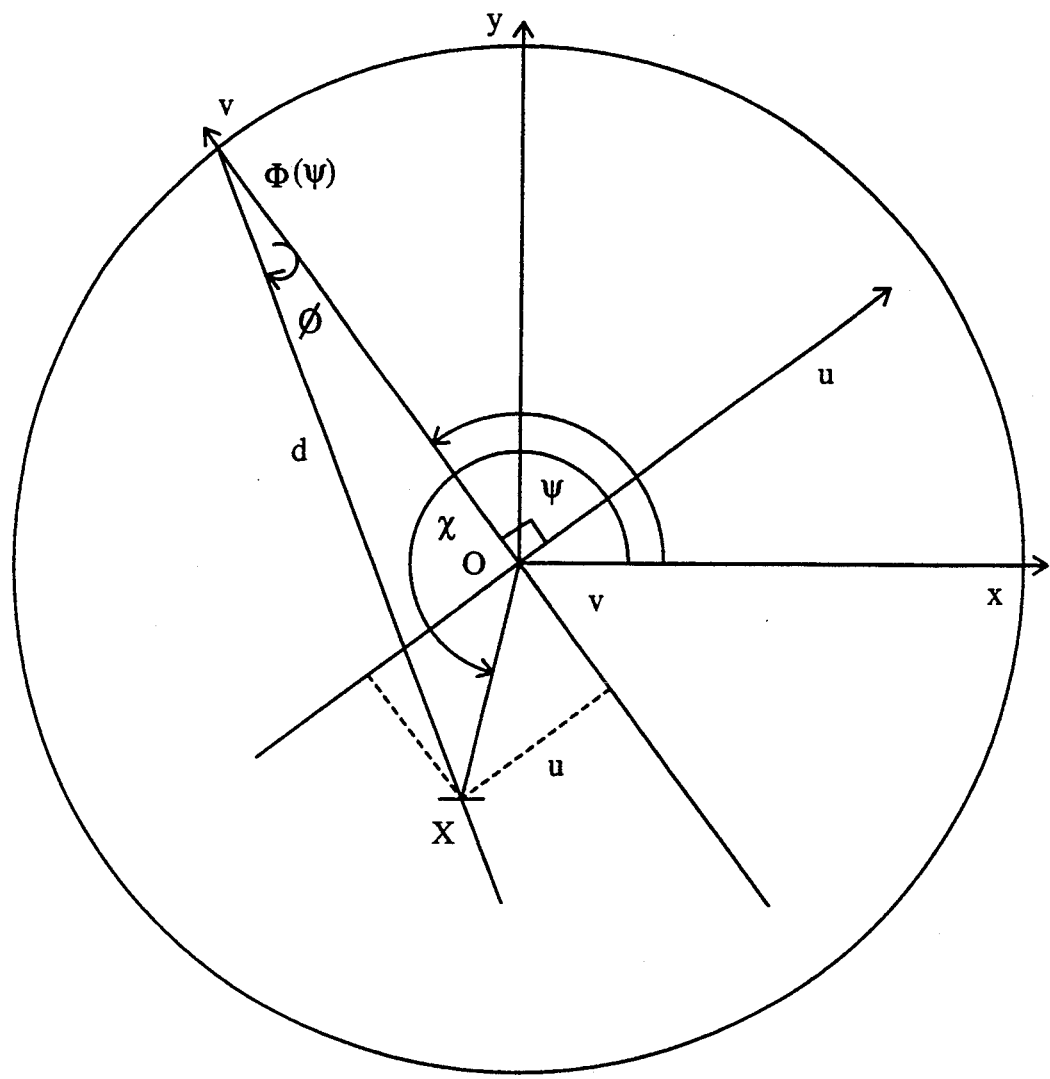

If u and v are the coordinates of the point X in the new coordinate system with O $\Phi(\psi)$ being the second axis, see FIG. 5, $$u = d\sin(\phi), \tag{28}$$

where d is the distance from the point X to $\Phi(\psi)$. Consequently, by differentiating both sides of the above equation with respect to the variable $\psi$, we obtain $$\begin{aligned} v &= d\cos\phi \frac{d\phi}{d\psi} \\ &= (\|\Phi(\psi)\| - v)\frac{d\phi}{d\psi}. \end{aligned} \tag{29}$$

Hence, Equation (27) can be rewritten as $$d\theta = \frac{\|\Phi(\psi)\|}{\|\Phi(\psi)\| - v} d\psi. \tag{30}$$

From the above relations, the reconstruction Equation (20) becomes $$f(X) = \frac{1}{2\pi^2} \int_{\psi_0}^{\psi_0+\psi_X} \frac{\|\Phi(\psi)\|}{\|\Phi(\psi)\| - v} q_\psi(\phi(X))d\psi, \tag{31}$$

where,
a) $\psi_X$ is the angle of the vertex which is the intersection of the trajectory $\Phi$ with the ray joining the starting view $\Phi(\psi_0)$ and the point X, and
b) $\phi(X)$ is the ray joining the vertex $\Phi(\psi)$ and the point X.

Note that in a numerical implementation of the above formula, the total number of views involved in the back-projection depends on the point X. However, this number is constant for all points along a line emanating from the vertex of the first view.

If we zero out the convolved view $q_\psi$, from the last ray of the fan to the ray (of angle $\phi_0(\psi)$) joining the vertex $\Phi(\psi)$ and the vertex of the starting view, i.e. if we define $q_\psi'$ by $$q_\psi'(\phi) = q_\psi(\phi), \text{ if } \phi < \phi_0(\psi), \quad (32)$$
$$= 0 \text{ otherwise,}$$

or, alternatively, if we multiply the convolved data along the two opposite rays with weights whose sum is equal to one, i.e.

$$q'_\psi(\phi) = w_\psi(\phi)q_\psi(\phi) \quad \text{if } \psi > \psi_0 + \pi - 2\Gamma \quad (33)$$
$$q'_{\psi+2\phi-\pi}(-\phi) = (1 - w_\psi(\phi))q_{\psi+2\phi-\pi}(\phi)$$
$$q'_\psi(\phi) = q_\psi(\phi), \text{ otherwise}$$

where $w_\psi$ is a differentiable function which is equal to 1 if $\phi < \phi_0(\psi)$, and which rolls down to zero at $\phi = \Gamma$, we obtain the following 180 degree plus fan reconstruction formula $$f(X) = \frac{1}{2\pi^2} \int_{\psi_0}^{\psi_0+2\Gamma} \frac{\|\Phi(\psi)\|}{\|\Phi(\psi)\| - \nu} q'_\psi(\phi(X))d\psi. \quad (34)$$

From the above observation, it follows that:
2. If the trajectory $\Phi$ is such that every line going through the reconstruction field intersects $\Phi$ at two points (e.g. a circle), then we can back-project all views for the complete 360 degree and reconstruct $2f(X)$, so that $$f(X) = \frac{1}{4\pi^2} \int_{\psi_0}^{\psi_0+2\pi} \frac{\|\Phi(\psi)\|}{\|\Phi(\psi)\| - \nu} q_\psi(\phi(X))d\psi. \quad (35)$$

Here we address the case when there is a finite number of views and rays. We assume further that,
1. the total number of views is M, and the angle between two consecutive views is constant and equal to $\Delta\psi$,
2. each view has $(2N+1)$ equal angular rays with $\Delta\phi = \Gamma/N$ being the angle between two consecutive rays.

Under these assumptions, the numerical evaluation of Equations (34) and (35) can be carried out as follows.

The convolved view $q_\psi$ given by Equation (22) can be evaluated using Simpson's method to compute an integral. From the definition of FP of an integral with kernel $1/(l^2)$, $q_\psi$ can be rewritten as $$q_\psi(\phi) = \frac{1}{\|\Phi(\psi)\|\cos\phi} \lim_{\epsilon \to 0}\left(\frac{2s_\psi(\phi)}{\epsilon} - \int_{|\phi-\gamma|>\epsilon} \frac{\cos(\phi-\gamma)}{\sin^2(\phi-\gamma)} s_\psi(\gamma)d\gamma\right). \quad (36)$$

Defining $S_m$ and $Q_m$ by $$S_m(n) = s_{m\Delta\psi+\psi_0}(n\Delta\phi), \quad (37)$$
$$Q_m(n) = q_{m\Delta\psi+\psi_0}(n\Delta\phi),$$

for $m = 0, 1, \ldots, M-1$, and $n = -N, \ldots, N$, the convolved view $q_\psi$ is approximated by taking $\epsilon = \Delta\Phi$, yielding $$Q_m(j) \simeq \frac{\Delta\phi}{\|\Phi(m\Delta\psi+\psi_0)\|\cos(j\Delta\phi)}\left(\frac{2S_m(j)}{\Delta\phi^2} - \sum_{\substack{n=-N \\ n \neq j}}^{n=N} \frac{\cos((j-n)\Delta\Phi)}{\sin^2((j-n)\Delta\phi)} S_m(n)\right). \quad (38)$$

for $j = -N, \ldots, N$.

Beside the weight, the right hand side of the above equation is the discrete convolution of $S_m$ with the kernel K defined by $$K(n) = \frac{2}{\Delta\phi^2} \quad \text{if } n = 0, \quad (39)$$
$$= -\frac{\cos(n\Delta\phi)}{\sin^2(n\Delta\phi)} \quad \text{if } n \neq 0.$$

The last step of the reconstruction involves the numerical evaluation of the integral either in Equation (34) or (35). This integration is known as the back-projection, i.e. the summation of weighted convolved views along rays going through the point X. This back-projection involves two steps. The first step is to estimate the expression $q_\psi'(\phi(x))$ in Equation (34) or $q_\psi(\phi(x))$ in Equation (35). The second step is to weight such an estimate and then to integrate the product from the starting fan to the last fan. Again, Simpson's method will be used to estimate an integral.

For the first step of this numerical evaluation, an array $Q_m'$ is formed from $Q_m$ based on Equation (32) or (33) in the case of 180 degree plus fan angle reconstruction. The expression $q_\psi'(\phi(x))$ in Equation (34) is estimated by an interpolation I as a function of the array $Q_m'$ and the point X, i.e.

$$q_\psi'(\phi(X)) \simeq I(Q_m', X). \quad (40)$$

In the case of linear interpolation, for example, the $j^{th}$ ray is located so that the point X lies within the sector defined by the rays j and (j+1). From this, the coefficient of proportionality $\lambda_{m,X}$ is calculated, and $$I(Q_m', X) = Q_m'(j) + \lambda_{m,X}(Q_m'(j+1) - Q_m'(j)). \quad (41)$$

Finally, the value f(X) is estimated based on Equation (34) as $$f(X) \simeq \frac{\Delta\psi}{2\pi^2} \sum_{m=0}^{m \leq M} \frac{\|\Phi(\psi)\|}{\|\Phi(\psi)\| - \nu} I(Q_m', X), \quad (42)$$

with $$\psi = m\Delta\psi + \psi_0. \quad (43)$$

The numerical evaluation of Equation (35) in terms of $Q_m$ can be carried out in a fashion similar to the above described procedure.

The reconstruction procedure described below assumes input data in the form of line integrals $\{S_m(n), m=0, \ldots, M-1; n=-N, \ldots, N\}$ as given in Equation (37). From these input data, the following steps are carried out:

1. Initialize m to zero, and set F(X)=0 for all pixels X.
2. Compute the convolved view $Q_m$ of the view $S_m$ according to Equation (38). This computation may be broken up as follows:
   a) compute the discrete Fourier transform of $S_m$ after padding it with 0,
   b) multiply the previous result with the discrete Fourier transform of the kernel K which is given by Equation (39), or alternatively with the product of the discrete Fourier transform of K with some window function, such as Hanning window, for a smoother reconstructed image,
   c) compute the discrete inverse Fourier transform of the output from the previous step,
   d) multiply the obtained result with the weight $w_m$ defined by $$w_m(j) = \frac{\Delta\phi}{\|\Phi(m\Delta\psi + \psi_0)\| \cos(j\Delta\phi)} \quad (44)$$

3. Generate $Q_m'$ by zeroing out the convolved view $Q_m$ along the appropriate rays based on the condition specified in Equations (32), or by weighting $Q_m$ based on Equation (33).
4. Back-project $Q_m'$ by generating the accumulating sum $$F(X) = F(X) + \frac{\Delta\psi}{2\pi^2} \frac{\|\Phi(\psi)\|}{\|\Phi(\psi)\| - v} I(Q'_m, X) \quad (45)$$

for all pixels X.
5. Increment m by 1, and go to step 2 if m<M.

When m=M−1, the accumulating sum F(X) is an estimate of f(X) for all pixels X.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A medical diagnostic scanner comprising:
   an x-ray source for generating a fan beam of radiation which is directed across an examination region, the x-ray source being mounted for rotation about a central point of the examination region;
   an x-ray detector array disposed across the examination region from the x-ray source for converting rays of the fan beam of radiation which have traversed the examination region into electronic data;
   a detector data memory for storing electronic data in data fans, each data fan having a plurality of data values, each data value in a given data fan corresponding to a ray of that fan beam, to produce data fans;
   a convolver means including:
      a convolver for convolving each data fan with a kernel function to produce convolved data fans, and
      a convolver weighting means for weighting each data value of a convolved data fan in proportion to the reciprocal of the cosine of the angle between its corresponding ray and the ray passing through the central point of the examination region, to produce weighted convolved data fans;
   a redundant ray removal processor connected to receive the output of the convolver, for removing redundant data values representing redundant rays from the weighted convolved data fans to produce corrected convolved data fans;
   a backprojector connected to receive the output of the redundant ray removal processor for back-projecting each corrected convolved data fan into an image memory;
   a processor for converting image data in the image memory to an appropriate format for display on a monitor.

2. The medical diagnostic scanner as set forth in claim 1 further including a zero-filling means for adding additional zero data values to each data fan stored in the detector data memory.

3. The medical diagnostic scanner as set forth in claim 2 wherein each data fan includes 2N+1 data values and wherein the zero-filling means adds 2N+1 zeroes to each data fan, where N is a positive integer.

4. The medical diagnostic scanner as set forth in claim 1 wherein the convolver includes:
   a Fourier transform means for transforming each of the data fans from real space to Fourier space;
   a filter means for filtering each of the Fourier space data fans with a roll-off filter;
   an inverse Fourier transform means for transforming the filtered data fans from Fourier space to real space.

* * * * *